Aug. 10, 1937.  C. B. HUNTMAN  2,089,263
STABILIZER FOR VEHICLES
Filed May 14, 1934
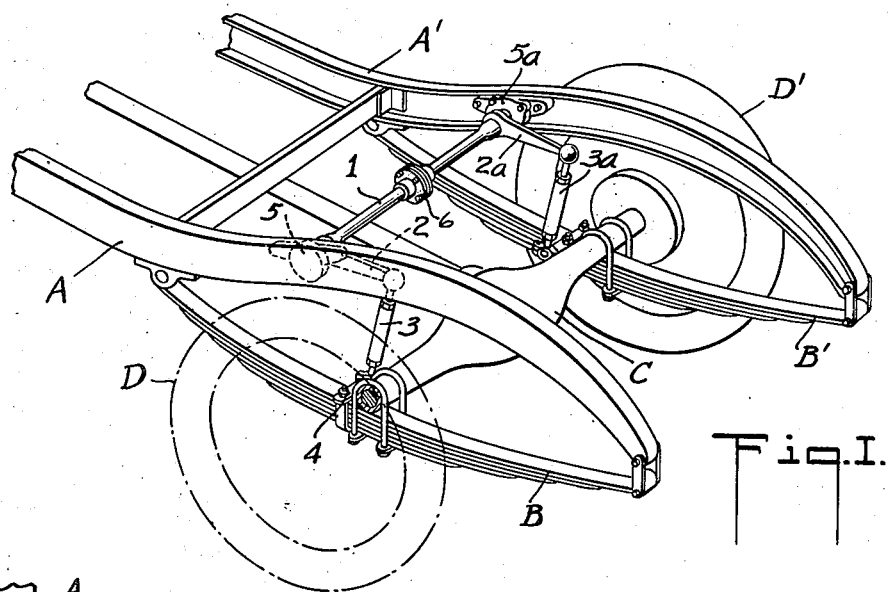
Fig. I.
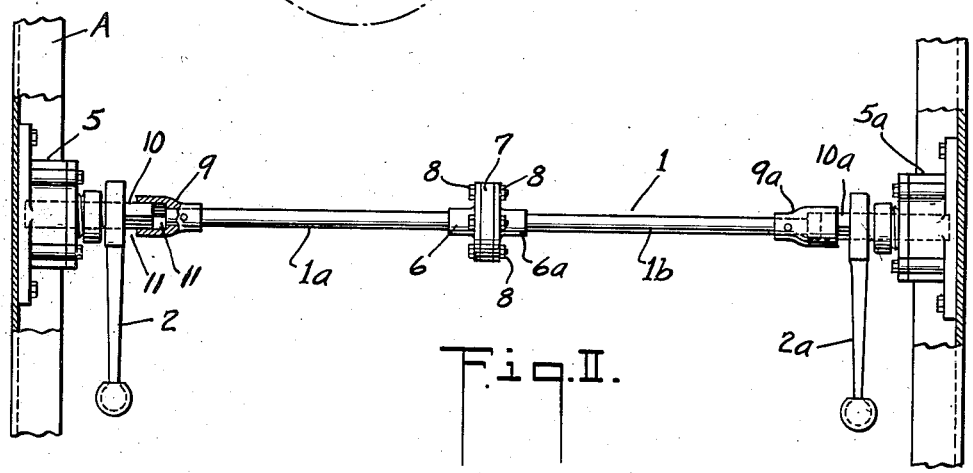
Fig. II.
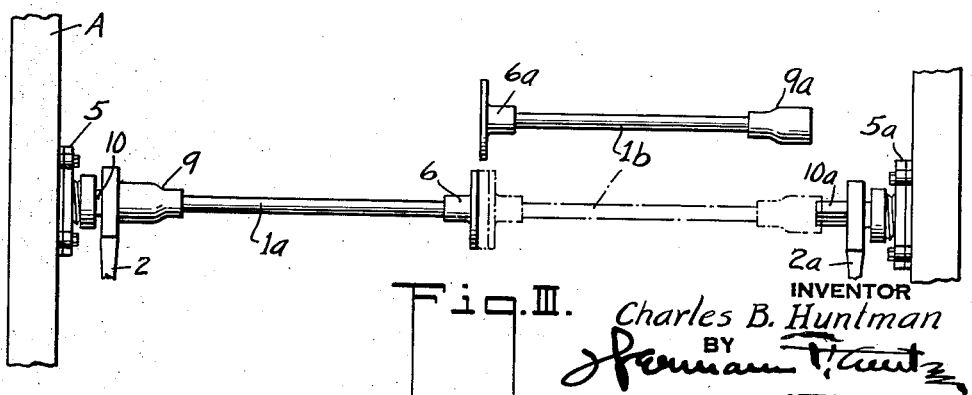
Fig. III.
INVENTOR
Charles B. Huntman
BY
ATTORNEY Patented Aug. 10, 1937

2,089,263

UNITED STATES PATENT OFFICE 2,089,263

STABILIZER FOR VEHICLES

Charles B. Huntman, Plainfield, N. J.

Application May 14, 1934, Serial No. 725,432

19 Claims. (Cl. 267—11)

This invention relates to the equalizing or balancing of shocks such as are involved in motor cars when the wheels on one side are displaced by the uneven contour of the road, or when centrifugal strain tends to careen the body when a car at speed is deflecting its course. It involves the absorbing of such shocks or strains, balancing the effect of the strains on both sides of the car, dampening the reaction of any wheel or body displacement due to such shocks or unequal force on opposite sides of the car, and various other advantages which will appear from the more detailed description hereinafter set forth and be pointed out in the claims.

In general, it relates to mechanism or apparatus, or car equipment which aims to prevent sidesway of the body or of the entire sprung mass when rounding curves at speed, and to prevent or minimize side-rocking or listing or rolling of the car due to uneven road surface, particularly when wheel or wheels on one side engage obstacles or ruts different in magnitude from those engaged by the wheel or wheels on the opposite side.

This particular application involves apparatus or structure to accomplish such advantageous results through instrumentalities providing practical means for effective use, economy and simplicity of manufacture, and particularly advantages with respect to the assembly of the apparatus and its embodiment in vehicles. In the particular embodiment herein illustrated and specifically described, one of numerous forms is shown in which mechanical means transmitting across the car the effect of vertical displacement of wheels or unequal vertical displacing forces on opposite sides of the vehicle with crosscar force transmitting means directly connecting shock-absorbing means fixedly mounted on the sprung mass on opposite sides. More particularly this case relates to embodiments of my invention in which the cross car force transmitting means is demountable and rigidly mountable to form the combination. In the specific form herewith illustrated it relates to such a demountable element as a mechanical torque-bar constructed in any manner that permits it to be attached or detached to any movable part of or connection with each shock absorber after the shock absorbers have been rigidly attached to the sills of the car, or any other suitable rigid members forming parts of the sprung mass.

This application is a continuation-in-part of my application for United States Letters Patent filed August 24, 1925, Serial No. 51,908, and among its objects are to facilitate the assembly of the construction, to make possible the installation when desired on vehicles previously equipped with part of the structure, and provide simplicity and economy in cost and equipment.

My invention herein claimed aims to provide a cross-car force-transmitting means for stabilizing, which is removable, or conversely which may be readily attached after the assembly into the vehicle of the shock-absorbing elements or other fixed parts of my combination. It permits the separate production of the torque-bar or other equivalent members, and provides for replacement in case of fracture or injury to the crosscar force-transmitting means without disturbing the other elements in my stabilizer shock-absorbing equipment. Likewise, the readily mountable and demountable element in my apparatus may be so fashioned as to provide for its addition to existing structures to increase the efficiency of the elements thereof by combining same realize the advantages of my stabilizing cross-car rigging. For example, an existing equipment of shock absorber may be somewhat overloaded or deficient in dampening or in other respects, so that by the addition of my readily mountable torque-bar or the like I provide for the cross car force transmission, thereby spreading or dividing the load between both shock absorbers. In the event of the original spring equipment of a car being soft, my stabilizing cross car-force-transmitting means will distribute the load on both springs from a one-sided shock so as to make them more adequate for the service required. It may also be noted that the extreme of stiffness required in conventional springs is largely because a spring on each side must carry more than half of the total sprung mass, in the event of the adjacent wheel being subject to road shock, whereas with my stabilizer the distribution of the shock to both springs permits them to be designed lighter and capable of giving a softer ride without their being too light to stand up ruggedly in service, and my removable cross-car force-transmitting means is available to correct the laudible desire of car designers to make the ride as soft as possible, which frequently results in additional softness developing as a spring or springs become set in use, thus the stabilizer bar restores them to the capacity for proper functioning.

While my removable cross-car force transmitting means may be made with many variations from the particular embodiment herein shown and described, the particular form herein illustrated comprises a torque bar, and of a modified form consisting of two parts which are adapted to be separated in a manner that readily permits the removal of each part from its connections with a shock absorber element.

In the accompanying drawing this form is illustrated in which:

Fig. I is a perspective view from one side at the rear, of the rear portion of an automobile chassis, containing my invention.

Fig. II is a plan view of the stabilizer equipment, of Fig. I fragmentary at the adjacent parts of the chassis where the same is mounted.

Fig. III is a plan view similar to Fig. II, but showing only the cross car torque-bar in course of mounting—or in the operation of removing the same.

The chassis has any typical sills A, A' with springs B, B' which are attached to provide the spring suspension of the axle housing C, usually by clamping the springs near their middle to the axle housing, while wheels D, D' are carried by the wheel-borne member such as the axle end or axle housing end and the parts adjacent thereto.

A torque-bar 1 extends from sill-to-sill and at each end is supported so that it may oscillate. Adjacent each end of the bar 1 are lever arms 2, 2a, the hub of each being operatively connected with the adjacent end of the transverse or torque-bar 1. The free ends of each lever are connected by suitable linkage 3, 3a to a part such as the clip 4 constituting a member immovable with respect to the wheel-borne part—or constituting the wheel-borne part.

The arms 2, 2a and the bar 1 are carried by the sills, or a suitable part of the sprung mass, and in the form illustrated they are operatively connected with the shock absorbers 5, 5a or a suitable oscillating or torque-responsive member of the shock absorbers.

The torque-bar A is in this form made in two parts 1a, 1b, and at their juxtaposed ends each has a flange end hub 6, 6a rigidly attached. A spacer 7 composed of hard material fits between the flange faces when the bar has been assembled, the bolts 8 then clamp rigidly together the flanges and filler 7. At the opposite end of each torque-bar member 1a, 1b, a socket or sockets 9, 9a with a polygonal interior, which may be square or hexagonal as desired, registers with the end 10, 10a of a shaft carried in the shock absorbers, respectively, 5, 5a. On these stub shafts 10, 10a the hubs of the arms 2, 2a are clamped or splined, or otherwise secured to turn in unison with the oscillation of the shafts 10, 10a forming the connection in the shock absorber with any suitable means for resisting oscillation particularly in one direction, namely, upon the recoil that follows the compression of the suspension springs B, B'.

As shown in Fig. II, the space or clearance 11 at one end permits the socket 9 to slide over the shaft end 10, so that when the filler or spacer 7 is removed the other half or section 1b of the torque-arm may be longitudinally moved so that its socket 9a moves beyond its engagement with the shaft 10a—and thereby permits the entire removal of shaft section 1b, after which the other half 1a of the torque-bar may be pulled off the stub-shaft 10. This permits the ready removal of the entire torque-bar, and likewise permits the ready assembly of the torque-bar, in its operative position between the two shock absorbers 5, 5a. The shocks absorbers being preferably rigidly attached at first, as they are mounted on portions of the frame, namely, the sill on opposite sides which are definitely and permanently spaced and do not permit spreading, the entire assembly of the stabilizer equipment can be effected by proper and permanent securing of the shock absorbers on the sills, and thereafter, at pleasure, attaching between them the entire operative cross car torque element or elements, so that it will function as herein explained and at the same time will permit the bodily removal of the cross-car force-transmitting means without disturbing the shock absorbers.

While I have specifically described one form of my invention, many variations may be made as for the sake of simplicity and economy, reversal of parts may be resorted to and other changes made, without departing from the spirit of my invention, and the scope of my invention is defined by the appended claims.

I claim:

1. A readily attachable cross-car force-transmitting means for automobile stabilizer and ride-control equipment, consisting of means transverse of the car incorporating mechanical means for ready attachment or detachment thereof to functionally interconnect shock-absorber elements fixed to opposite sides of an automobile.

2. In an automobile ride stabilizer equipment, a readily attachable and detachable transverse torque-bar adapted to be supported by fixed members on an automobile frame and detachable without detaching the fixed members.

3. A torque-bar for automobile stabilizing and ride-control equipment, consisting of a transverse bar provided with attachment means so constructed as to be operatively connected to shock absorbers without disturbing the same.

4. In an automobile stabilizing equipment, a removable torque-bar, cooperating lever arms and links at axle means, and a fixed member at each sill of the automobile so constructed as to oscillatably support the lever arms and the ends of the bar and to permit the removal of the torque bar without disturbing the lever arms supported by the fixed members.

5. In an automobile ride stabilizer equipment, a readily attachable and detachable transverse force transmitting means adapted to be supported by fixed members on an automobile frame and detachable without detaching the fixed members.

6. A readily attachable torque-bar for automobile stabilizer and ride-control equipment, consisting of a transverse bar incorporating bolt-held means for attachment of said bar to interconnect shock absorbers fixed to opposite sides of the frame of an automobile.

7. A readily attachable torque-bar for automobile stabilizing equipment consisting of a bar, means on said bar to operatively interconnect the same between shock absorbers fixed to each side of an automobile frame, and having bolt-held means for fixedly attaching the bar to rigidly secure said bar into its functioning position.

8. In an automobile ride-stabilizer equipment, means interconnecting the unsprung and the sprung mass of the automobile, and having readily attachable and detachable transverse force-transmitting means adapted to be supported by fixed members on one of said masses and detachable without detaching the fixed members.

9. In an automobile having an unsprung and sprung mass, a ride-stabilizer equipment including a readily attachable and detachable transverse torque-bar adapted to be supported by fixed members on a part of one of said masses, and detachable without detaching the fixed members.

10. A readily attachable cross car force transmitting means for automobile stabilizer and ride-control equipment, consisting of means transverse of the car incorporating mechanical means for ready attachment or detachment thereof to interconnect shock absorber elements fixed to opposite sides of the frame of an automobile.

11. The combination in a motor vehicle having a sprung mass and an unsprung mass, of a detachable and removable transverse equalizing bar at the sprung mass and provided with operative connections to the unsprung mass including shock absorber means at the ends of the bar operated by the bar or the unsprung mass.

12. In an automobile, two side frame members rigidly spaced apart, a shock absorber element rigidly attached to each side frame member and each having a lever arm with connections responsive to the relative movement of a wheel-borne member with respect to the frame member on each side, and a demountable torque-bar connecting the shock absorbers.

13. In an automobile, a ride stabilizer and equipment of the character described having shock absorber elements rigidly attached one on each side sill, a removable or demountable cross car torque-bar operatively interconnecting the shock absorber elements, a lever arm on each side linked respectively to opposite ends of axle means and conjointly cooperating with the torque-bar and shock absorbers.

14. The combination in a motor vehicle having a sprung mass and an unsprung mass, of a detachable and attachable transverse equalizing force transmitting means at the sprung mass and provided with operative connections to the unsprung mass, including shock absorber means at the ends of the transverse equalizing force transmitting means actuated thereby or by the unsprung mass.

15. In an automobile, a ride stabilizer equipment of the character described having shock absorber elements rigidly attached one on each side sill, a removable and readily mountable cross car force transmitting means operatively interconnecting the shock absorber elements, a lever arm on each side linked respectively to opposite ends of axle means and conjointly co-operating with the cross car force transmitting means and shock absorber elements.

16. In an automobile stabilizing equipment, a readily mountable and removable cross car force transmitting means, cooperating lever arms and links at axle means, and a fixed member at each side of the automobile so constructed as to oscillatably support the lever arms and to support the ends of the cross car force transmitting means and to permit removal of the latter without disturbing the lever arms supported by the fixed members.

17. In an automobile, two side frame members rigidly spaced apart, a shock absorber element rigidly attached to each side frame member and each having a lever arm with connections responsive to the relative movement of a wheel-borne member with respect to the frame member on each side, and a readily mountable and demountable cross car force transmitting means connecting the shock absorber elements so constructed and arranged whereby movement of either of said lever arms is transmitted to the other.

18. The combination in a motor vehicle having a sprung mass and an unsprung mass of a pair of sills rigidly spaced with relation to each other and supporting the sprung mass, a shock absorber rigidly mounted at each sill, operative connections from each shock absorber to an adjacent wheel and a transverse equalizing bar connecting the shock absorbers and so constructed and arranged as to be removable without disturbing the shock absorbers.

19. In a vehicle having a frame and two opposed wheels carrying said frame and each carried by a wheel-carrying member permitting relative movements between said frame and the corresponding wheel, a shock absorber on each side of the vehicle interposed between the frame and the corresponding wheel-carrying member to damp such relative movements, means including a detachable member connecting said shock absorbers with each other, said member functioning to cause the shock absorber actually not actuated to effect a similar action as that of the shock absorber actually actuated and when functionally disconnected from said shock absorbers permitting said shock absorbers to act independently of each other.

CHARLES B. HUNTMAN.

DISCLAIMER 2,089,263.—*Charles B. Huntman*, Plainfield, N. J. STABILIZER FOR VEHICLES. Patent dated August 10, 1937. Disclaimer filed December 31, 1943, by the assignee, *Huntman Stabilizer Corporation*.

Hereby enters this disclaimer to claims 1 to 19 inclusive.

[*Official Gazette February 1, 1944.*]